United States Patent Office 2,970,985
Patented Feb. 7, 1961

2,970,985

CURING CATALYSTS FOR ACROLEIN-PENTAERYTHRITOL RESINS

Howard R. Guest, Charleston, Joe T. Adams, St. Albans, and Ben W. Kiff, Ona, W. Va., assignors to Union Carbide Corporation, a corporation of New York No Drawing. Filed Dec. 24, 1956, Ser. No. 630,046

14 Claims. (Cl. 260—67)

This invention relates to an improved catalyst for curing certain heat-hardenable synthetic resins.

The formation of polymers by the condensation of acrolein and pentaerythritol is known, but the process has been given only limited attention. At present, two methods are known for carrying out the polymer reaction. According to one method, the reaction is carried out by first forming and isolating the unsaturated acetal resulting from the reaction of acrolein and pentaerythritol, having the structure:

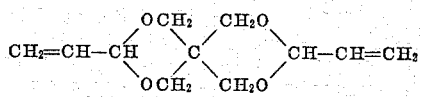

3,9-divinylspirobi (m-dioxane), M.P. 43° C. (diallylidenepentaerythritol)

This unsaturated acetal is then reacted with a polyhydric alcohol in the presence of an acidic catalyst to yield a polymer. Suitable polyhydric alcohols include sorbitol, trimethylol ethane or trimethylol propane.

The practice of the second method involves the formation of a liquid pre-condensate by reacting acrolein and pentaerythritol in reciprocal proportion to their functionality. Thus, pentaerythritol has a functionality of four as a polyhydric alcohol, and acrolein has a functionality of three, considering the reactivity of both the carbonyl group and the olefinic group. The pre-condensate thus formed on reacting about three moles of pentaerythritol and about four moles of acrolein in the presence of an acid catalyst is a viscous liquid or A-stage resin which slowly condenses to a solid plastic. However, for practical applications, the condensation can be stopped by the neutralization of the catalyst. The neutral liquid pre-condensate can be stored until needed and can then be hardened into a plastic by the addition of a mineral acid or a strong organic acid.

Our invention is an improvement upon this second method whereby a distinctive curing catalyst for the liquid or A-stage resin is provided.

The curing operation takes place at elevated temperatures. Many acid or acid-reacting substances have heretofore been used as curing catalysts. Among them are sulfuric acid, toluene sulfonic acid, benzenesulfonic acid, mixed alkanesulfonic acids, aluminum chloride, titanium tetrachloride, stannic chloride and zinc chloride. Mixing these materials with the A-stage resin is often difficult. Some of them are solids and must be dissolved in a liquid miscible with the resin. Such solvent must be removed before the resin is cured, or the properties of the polymer are adversely affected. Dispersion of the liquid acidic catalysts is also troublesome since all of the above mentioned materials tend to burn or char the resin in localized areas if the mixture is not agitated vigorously. When such agitation is carried out, air is emulsified in the resin, and this is often difficult to remove. If the air is not removed, bubbles are formed in the castings on curing. If solutions of the liquid catalysts are used, the problem of solvent removal is present, of course.

In curing the A-stage resin with these known catalysts, it has been necessary heretofore to heat the mixture gradually to curing temperatures of 100° C. and above to avoid charring and volatilization of the small amounts of uncombined 3,9-divinylspirobi(m-dioxane) present in the A-stage resin before it is consumed in forming part of the growing polymer molecule. This gradual heating prolongs the curing operation until several hours are required for complete polymerization.

All of these catalysts enumerated above, and any others which have been used heretofore, also suffer from the serious disadvantage that they do not cure the resin in the presence of iron or steel. This is particularly serious because many of the molds for curing the resin would normally be made of steel. To make special molds of stainless steel or aluminum would make the cost of using the material prohibitive in many instances.

In certain applications, such as making forms for stamping metal parts, it is desirable to harden the resin by mixing it before curing with appreciable quantities of iron powder. In some cases the iron may amount to 20–40% by weight of the final mixture. The fact that the iron powder cannot be used as filler with the conventional catalysts limits the usefulness of the resin.

We have now found that sulfate esters of an alcohol, such as the dialkyl sulfates, are excellent curing catalysts for the acrolein-pentaerythritol resins and that they do not suffer from the deficiencies described above. Diethyl sulfate was found to be a particularly valuable material for this purpose.

These dialkyl sulfate catalysts, being neutral or only weakly acidic in their original state, can be added directly to the A-stage resin without causing any localized burning or charring at temperatures as high as 70° C. No solvent is required since the liquid dialkyl sulfates disperse readily with the resin. With these catalysts the resin can be cured in steel molds and iron powder can be used as a filler with satisfactory results.

Diethyl sulfate is typical of the dialkyl sulfates and can react in two ways to liberate an acid which is the ultimate catalyst. In the A-stage resin there are always some free hydroxyl groups. These react with the diethyl sulfate to give ethyl sulfuric acid:

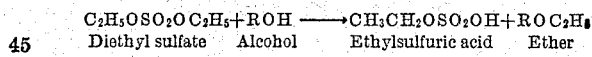

This reaction begins at a relatively slow rate below 90° C. and accelerates as the temperature increases. Above 170° C., a different reaction sets in to yield ethylene and sulfuric acid:

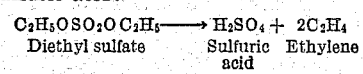

The diethyl sulfate is therefore, in effect, a latent catalyst. This is a great advantage since it can be added to the liquid A-stage resin and the mixture can be stored for some time, if desired, before it is cured. In fact, in one experiment such a mixture was stored for over 400 hours without appreciable polymerization occurring. After that length of time, samples of the material were heated and converted to polymer with good properties.

A-stage resins may be cured in much shorter time by using dialkyl sulfates, such as diethyl sulfate, rather than conventional catalysts. No caution need be exercised in the rate at which the temperature is raised to the curing range. This allows the resin to be heated at a rapid rate and since acid is generated in situ in an intimate admixture with the resin the cure is effected very quickly. For instance, at 150° C. the polymerization takes place in as short a time as 20 minutes using diethyl sulfate catalyst, whereas with conventional catalysts mentioned above the curing time at 150° C. would be in excess of an hour. The ability to shorten the curing time to this extent would greatly increase the productive capacity of a given piece of equipment.

While the diethyl sulfate allows the use of high temperatures during the curing step, satisfactory polymerization will take place as low as 70° C. However, the curing step may require as long as 24 hours at this temperature. A satisfactory curing temperature range with this catalyst is from 70° C. to 160° C.

Concentrations of 0.05% to 2% of diethyl sulfate based on the weight of the resin have been used with good results. Most satisfactory polymers have been obtained with 0.25% to 1.0% of the catalyst.

Other dialkyl sulfates are satisfactory catalysts for the polymerization. Dimethyl sulfate, diisopropyl sulfate, and di-secondary butyl sulfate have all been used with good results. While higher dialkyl sulfates can be used, they are less efficient because of the dilution effect of the long alkyl groups in generating a given amount of acid. In general, therefore, the alkyl groups may contain up to 18 carbon atoms, with those dialkyl sulfates containing up to 8 carbon atoms in the alkyl group being preferred.

In addition to these dialkyl sulfates, other sulfate esters of alcohols, including polyhydric alcohols, such as pentaerythritol sulfate, may be employed as curing catalysts.

In carrying out the invention, it is important that the dialkyl sulfates be added as a separate step after the preparation of the A-stage resin. If the dialkyl sulfates were used as the catalyst to prepare the A-stage resin from acrolein and pentaerythritol, they would be hydrolyzed by the water of condensation formed to sulfuric acid, and thus could not serve as latent catalysts in the curing step as herein described. Such use of the dialkyl sulfates would be equivalent to using sulfuric acid from the start, as both the acetalization catalyst for the initial A-stage reaction and for the curing catalyst for making the final polyether polymers by interaction of free hydroxyl groups and free vinyl groups in the A-stage resin.

In general, therefore, any of the known acidic catalysts will be employed for the initial reaction of acrolein and pentaerythritol to form the A-stage resin, and such catalyst may be neutralized before addition of the dialkyl sulfate curing catalyst. We prefer, however, to use as an A-stage catalyst, hydrochloric acid, which does not require neutralization, as described in our copending application Serial No. 596,431, filed July 9, 1956. This catalyst, being volatile, can be removed from the A-stage resin by distillation, at least in part, and the non-distillable part does not interfere with the subsequent curing operation. By the use of hydrochloric acid as an initial acetalization catalyst, it is possible to control the viscosity of the A-stage resin. Thus, after removal of volatile material, a low viscosity A-stage resin may be obtained by this method having a viscosity of 5000 to 25,000 cps. at 40° C. Similarly, by adjustment of reaction conditions, high viscosity resins may be obtained having a viscosity of 25,000 to 500,000 cps. at 40° C.

Lower viscosity A-stage resins having a viscosity of 1000 to 1500 cps. on a volatility-free basis may be obtained using a low concentration of sulfuric acid as a catalyst and employing relatively short reaction times.

While the preferred embodiment of the invention involves the volatilization or removal of the catalyst used to prepare the A-stage resin prior to the addition of a sulfate ester as a curing catalyst, this is not always essential. For example, where metal fillers are to be used, and no cure would be obtained with a conventional acid catalyst, the desired cure with a dialkyl sulfate curing catalyst would result even though the A-stage catalyst were still present.

In addition to powdered iron fillers, other metallic fillers may be added to the liquid resin before curing, such as powdered aluminum or copper. Also, other fillers may be employed, such as powdered alumina, diatomaceous earth, asbestos and the like. Also, pigments, such as titanium dioxide, may be added to the liquid resin and the pigmented resin dissolved in a solvent, such as butanol or methyl ethyl ketone. Such lacquers containing the latent catalyst may be readily stored, and then baked on steel surfaces to form ornamental and protective finishes.

Also, the physical properties of the cured resins may be modified by additions of 3,9-divinylspirobi(m-dioxane) as described in our copending application Serial No. 596,814, filed July 10, 1956, or of acrolein dimer as set forth in our copending application Serial No. 596,823, filed July 10, 1956.

The cured resins of this invention may be used in any of the applications where rigid plastic materials of good strength and toughness, and light in color, are desired. Also, because of their excellent light stability and resistance to hydrolysis they are valuable for many fields now served by the methyl methacrylate resins, such as display signs, ornaments, fixtures, and dentures. The liquid resins may also be used for sealing and potting compounds in the electrical industry. They are also valuable as laminating resins in making laminates of glass cloth.

Example I

A charge of 1062 grams of 96.6% acrolein (18.35 moles), 1500 grams pentaerythritol (11 moles), and 2.47 grams sulfuric acid in 3 cc. of water was stirred for 85 minutes at 73–75° C. There were added 4.5 grams of sodium acetate to neutralize the catalyst. The viscosity of the crude mixture was 76 cps. Volatile material was stripped off to a kettle temperature of 75° C./3 mm. to form an A-stage resin in the low viscosity range.

A portion (140 grams) of this A-stage resin was mixed with 0.71 gram of diethyl sulfate. Part of this mixture was heated for 40 minutes at 125° C. The resulting polymer had these properties:

Heat distortion, ° C_____ 80
Flexural modulus_____p.s.i__ 346,000
Hardness, durometer "D"_____ 86
Impact (Izod), ft.-lbs. per inch of notch_____ 0.8

The other portion was heated for 90 minutes at 125° C. and had these properties:

Heat distortion, ° C_____ 87
Flexural modulus _____p.s.i__ 374,000
Hardness, durometer "D"_____ 86
Impact (Izod), ft.-lbs. per inch of notch_____ 0.8

Example II

An A-stage resin was prepared by the reaction of acrolein and pentaerythritol using hydrochloric acid to make a relatively high viscosity material. This was mixed with 30% 3,9-divinylspirobi(m-dioxane) to improve the properties of the final polymer. A sample of this material was cured with 0.3% mixed alkanesulfonic acids for 52 minutes at 75° C. to give a polymer with these properties:

Heat distortion, ° C_____ 92
Flexural modulus_____p.s.i__ 369,000
Hardness, durometer "D"_____ 86
Impact (Izod), ft.-lb. per inch of notch_____ 0.6

Another sample was cured with 1.64% diethyl sulfate for 52 minutes at 75° C. The polymer had these properties:

Heat distortion, ° C_____ 90
Flexural modulus_____p.s.i__ 364,000
Hardness, durometer "D"_____ 87
Impact (Izod), ft.-lb. per inch of notch_____ 0.6

This example shows that the dialkyl sulfate catalysts have no adverse effect on the physical properties of the cured resin.

Example III

An A-stage resin was prepared by the reaction of pentaerythritol and acrolein using hydrochloric acid catalyst. After stripping off volatile materials, the resin was mixed with 0.5% diethyl sulfate. This mixture was stored at 25° C. for 246 hours. No noticeable polymerization occurred. A sample was then heated for 8 hours at 100° C. and the resulting polymer had these properties:

| | |
|---|---|
| Heat distortion, ° C | 93 |
| Flexural modulus p.s.i. | 374,000 |
| Hardness, durometer "D" | 85 |
| Impact strength (Izod), ft.-lbs. per inch of notch | 0.8 |

The storage period was continued for a total of 408 hours. No change was apparent in the material. A sample was heated for 8 hours at 125° C. and the resulting polymer had these properties:

| | |
|---|---|
| Heat distortion, ° C | 85 |
| Flexural modulus p.s.i. | 379,000 |
| Hardness, durometer "D" | 85 |
| Impact strength (Izod), ft.-lbs. per inch of notch | 1.0 |

Example IV

An A-stage resin was prepared from acrolein and pentaerythritol using hydrochloric acid catalyst and freed from volatile matter by stripping. A mixture of 160 grams of this material, 40 grams of iron powder and 1.86 grams of diethyl sulfate, were stirred and heated to 140° C. for 15 minutes until it began to thicken. A portion was cured in an aluminum mold for eight hours at 125° C. and the polymer had these properties:

| | |
|---|---|
| Heat distortion, ° C | 103 |
| Flexural modulus p.s.i. | 395,000 |
| Hardness, durometer "D" | 86 |
| Impact (Izod), ft.-lbs. per inch of notch | 0.5 |

Another portion was cured in a steel mold for eight hours at 125° C. and had these properties:

| | |
|---|---|
| Heat distortion, ° C | 105 |
| Flexural modulus p.s.i. | 354,000 |
| Hardness, durometer "D" | 86 |
| Impact (Izod), ft.-lbs. per inch of notch | 0.2 |

A similar material, containing mixed alkane sulfonic acids as a catalyst, did not cure at all under these conditions.

Example V

An A-stage resin, prepared from pentaerythritol and acrolein with hydrochloric acid catalyst, was mixed with 25% by weight of iron powder and 1.2% by weight of dimethyl sulfate. This mixture was poured into molds and cured in an oven at 150° C. for 16 hours. The resulting resin was hard and tough and the iron powder was dispersed throughout the casting.

Example VI

An A-stage resin similar to that used in Example V was mixed with 0.28% by weight of diisoproply sulfate. This mixture was poured into suitable molds and cured for 18 hours in an oven at 120° C. The resulting cast resin had the following properties:

| | |
|---|---|
| Heat distortion, ° C | 72 |
| Flexural modulus, p.s.i. | 379,000 |
| Hardness, durometer "D" | 85 |
| Impact strength (Izod), ft.-lbs. per inch of notch | 0.8 |

Example VII

An acrolein-pentaerythritol resin identical to that used in Example VI was mixed with 0.29% by weight of di(secondary butyl) sulfate at 60° C. The mixture was then cast in suitable molds and cured in a 100° C. oven for 18 hours. The cured resin had the following properties:

| | |
|---|---|
| Heat distortion, ° C | 60 |
| Flexural modulus, p.s.i. | 400,000 |
| Hardness, durometer "D" | 84 |
| Impact strength (Izod), ft.-lbs. per inch of notch | 1.49 |

The foregoing examples have illustrated the use of various dialkyl sulfates as curing catalysts. Sulfate esters of other alcohols may be substituted for these dialkyl sulfates in the foregoing examples. In addition, mixed alkyl sulfates, such as ethyl methyl sulfate or ethyl isopropyl sulfate may be used.

Example VIII

Pentaerythritol tetrasulfate was prepared according to the procedure described in J. Gen. Chem. USSR 16, 677–88 (1946) (Chemical Abstracts 41, 1207h, 1947) by the reaction of pentaerythritol with chlorosulfonic acid. An A-stage resin prepared from acrolein and pentaerythritol was mixed with 0.3% by weight of this pentaerythritol tetrasulfate and poured into molds. After curing for 16 hours at 100° C. the resulting polymer was hard and tough and had other physical properties similar to those described in the preceding examples. This example illustrates the use of pentaerythritol tetrasulfate as curing catalyst.

What is claimed is:

1. Process for forming synthetic resins which comprises reacting acrolein and pentaerythritol in the molar ratio of about four to three and in the presence of an acidic catalyst to form a liquid resin, said acidic catalyst being selected from the group consisting of hydrochloric acid, sulfuric acid, toluenesulfonic acid, benzenesulfonic acid, mixed alkanesulfonic acids, aluminum chloride, titanium tetrachloride, stannic chloride and zinc chloride, and curing the liquid resin to a solid polymer by heating the liquid resin at a temperature of 70° C. to 160° C. admixed with from 0.05 to 2% by weight of a fully esterified sulfate ester of an alcohol.

2. Process for forming synthetic resins which comprises reacting acrolein and pentaerythritol in the molar ratio of about four to three and in the presence of an acidic catalyst to form a liquid resin, said acidic catalyst being selected from the group consisting of hydrochloric acid, sulfuric acid, toluenesulfonic acid, benzenesulfonic acid, mixed alkanesulfonic acids, aluminum chloride, titanium tetrachloride, stannic chloride and zinc chloride, removing the acidic catalyst from the liquid resin, and curing the liquid resin to a solid polymer by heating the liquid resin at a temperature of 70° C. to 160° C. admixed with from 0.05 to 2% by weight of a fully esterified sulfate ester of an alcohol.

3. Process for forming synthetic resins which comprises reacting acrolein and pentaerythritol in the molar ratio of about four to three and in the presence of hydrochloric acid as a catalyst to form a liquid resin, distilling off at least part of the hydrocholoric acid, and curing the liquid resin to a solid polymer by heating the liquid resin at a temperature of 70° C. to 160° C. admixed with from 0.05 to 2% by weight of a fully esterified sulfate ester of an alcohol.

4. Process for forming synthetic resins which comprises reacting acrolein and pentaerythritol in the molar ratio of about four to three and in the presence of an acidic catalyst to form a liquid resin, said acidic catalyst being selected from the group consisting of hydrochloric acid, sulfuric acid, toluenesulfonic acid, benzenesulfonic acid, mixed alkanesulfonic acids, aluminum chloride, titanium tetrachloride, stannic chloride and zinc chloride, removing the acidic catalyst from the liquid resin, and curing the liquid resin to a solid polymer by heating the liquid resin at a temperature of 70° C. to 160° C. admixed with from 0.05 to 2% by weight of a dialkyl sulfate.

5. Process as claimed in claim 4 in which the dialkyl sulfate is diethyl sulfate.

6. Process as claimed in claim 4 in which the dialkyl sulfate is dimethyl sulfate.

7. Process as claimed in claim 4 in which the dialkyl sulfate is diisopropyl sulfate.

8. Process as claimed in claim 4 in which the dialkyl sulfate is di(secondary butyl)sulfate.

9. Process as claimed in claim 2 in which the sulfate ester is pentaerythritol tetrasulfate.

10. A condensation product of acrolein and pentaerythritol in the molar ratio of about four to three and having a viscosity of 1000 to 500,000 cps. at 40° C. containing, as a curing catalyst, a completely esterified sulfate ester of an alcohol in an amount from 0.05 to 2% of the condensation product.

11. A condensation product of acrolein and pentaerythritol in the molar ratio of about four to three and having a viscosity of 1000 to 500,000 cps. at 40° C. containing, as a curing catalyst, a dialkyl sulfate in an amount from 0.05 to 2% of the condensation product.

12. A condensation product of acrolein and pentaerythritol in the molar ratio of about four to three and having a viscosity of 5000 to 500,000 cps. at 40° C. containing, as a curing catalyst, diethyl sulfate in an amount from 0.05 to 2% of the condensation product.

13. A heat-hardenable composition of matter comprising a condensation product of acrolein and pentaerythritol in the molar ratio of about four to three and having a viscosity of 1000 to 500,000 cps. at 40° C., a powdered metal filler and, as a curing catalyst, a dialkyl sulfate in an amount from 0.05 to 2% of the condensation product.

14. A heat-hardenable composition of matter comprising a condensation product of acrolein and pentaerythritol in the molar ratio of about four to three and having a viscosity of 1000 to 500,000 cps. at 40° C., a powdered metal filler and, as a curing catalyst, diethyl sulfate in an amount from 0.05 to 2% of the condensation product.

References Cited in the file of this patent

UNITED STATES PATENTS

| | | |
|---|---|---|
| 2,292,611 | Caplan | Aug. 11, 1942 |
| 2,401,776 | Rothrock | June 11, 1946 |
| 2,687,407 | Orth | Aug. 24, 1954 |

FOREIGN PATENTS

| | | |
|---|---|---|
| 870,032 | Germany | Mar. 9, 1953 |
| 1,108,885 | France | Sept. 14, 1955 |

OTHER REFERENCES

Schulz et al.: Angewandte Chemie, vol. 62, #5, March 1950, pp. 105, 113, 114, 117, 118.